(12) United States Patent
Bieven et al.

(10) Patent No.: US 6,394,544 B1
(45) Date of Patent: May 28, 2002

(54) CONVERTIBLE HEAD SUPPORT

(75) Inventors: Franck Bieven, Paris; Francois Le Gall, Coulonges, both of (FR)

(73) Assignee: Centre d'Etude et de Recherche pour l'Automobile (CERA), Reims (FR)

( * ) Notice: Subject to any disclaimer, the term of this patent is extended or adjusted under 35 U.S.C. 154(b) by 0 days.

(21) Appl. No.: 09/612,364

(22) Filed: Jul. 7, 2000

(30) Foreign Application Priority Data

Jul. 8, 1999 (FR) ............................................. 99 08850

(51) Int. Cl.$^7$ ................................................. A47C 7/00
(52) U.S. Cl. ...................... 297/283.4; 297/408; 297/410
(58) Field of Search ................................. 297/391, 118, 297/408, 410, 283.4, 283.1

(56) References Cited

U.S. PATENT DOCUMENTS

| | | | | |
|---|---|---|---|---|
| 3,376,064 A | * | 4/1968 | Jackson | |
| 3,888,540 A | * | 6/1975 | Protze et al. | |
| 5,531,505 A | * | 7/1996 | Baetz et al. | |
| 5,622,405 A | * | 4/1997 | Pitencel | |
| 5,906,414 A | * | 5/1999 | Rus | |
| 6,113,192 A | * | 9/2000 | Schneider | |

* cited by examiner

Primary Examiner—Milton Nelson, Jr.
(74) Attorney, Agent, or Firm—Dennison, Scheiner & Schultz

(57) ABSTRACT

This invention relates to a convertible head support for use by a child or an adult, particularly in an automotive vehicle, comprising a support (1) and a flap (2) hinged on the support around an axis (6) that is essentially horizontal from a high user position for an adult to a low user position for a child, said flap comprising a support body (11) that is generally flat and that on one of its faces has a head support surface for the adult and on its other face a head support surface for the child.

The flap comprises two lateral flanges (12) that are essentially vertical and that extend from the edges of the support body (11) on the side of its face presenting the head support surface for the child and the support body (11) and the two lateral flanges (12) are complementary to said support (1) so as to fit around the support when flap (2) is in the high position.

10 Claims, 2 Drawing Sheets

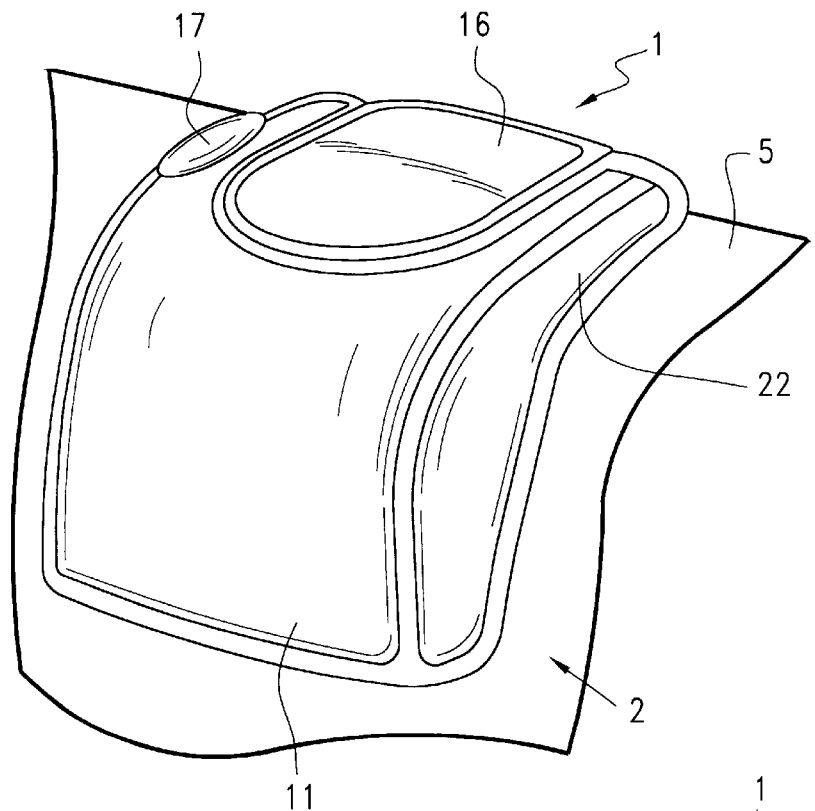
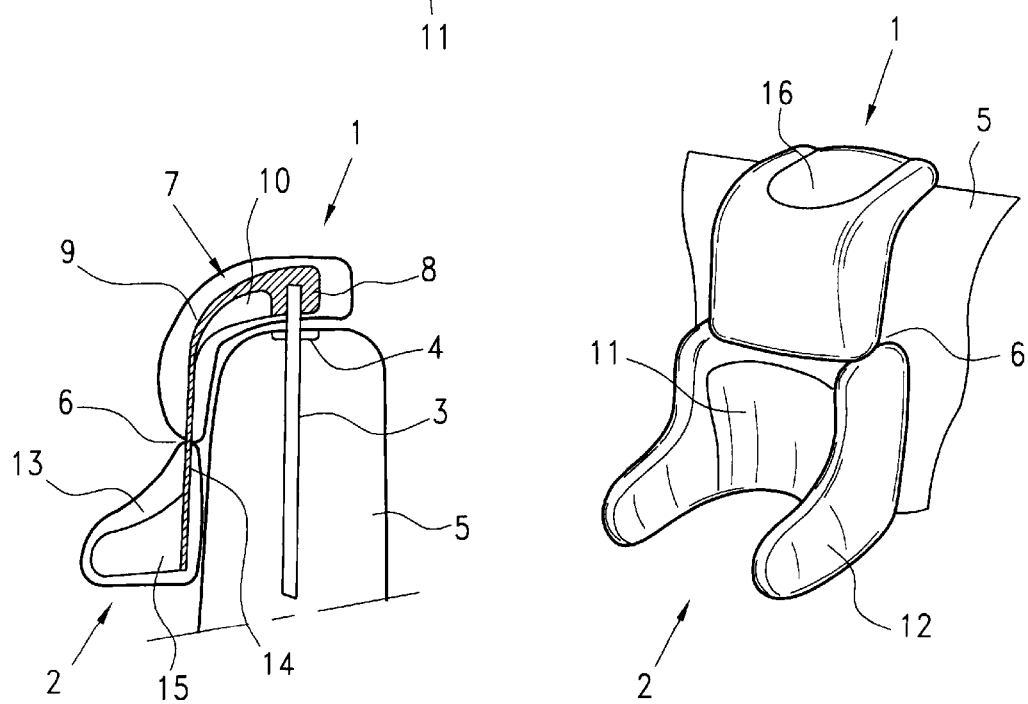

CONVERTIBLE HEAD SUPPORT

This invention relates to a convertible head support that is easy to handle and that is intended for use with children or adults, especially in an automotive vehicle.

The problem of safety for occupants of automotive vehicles is particularly crucial when children are involved. Indeed, in most vehicles, neither the seats nor the head supports nor the layout of the safety belts are adapted for their size.

As for children who are said to be in mass group 0 and 0+, weighing less than 13 kg, regulations require the use of retaining devices of the "integral" class, such as children's safety seats, baby seats or cellular seats, which have their own safety clasps; devices that, when they are not integrated, are positioned on the seats or benches of the vehicle in a position facing to the rear or crosswise with respect to the road and which one secures by any suitable means, for example, with the help of vehicle safety belts or specific anchoring systems when the vehicle is equipped with them.

For children in weight groups I, II and III weighing between 13 kg and 36 kg, regulations authorize placing the child facing forward and using retention devices that are said to be of the "nonintegral" class.

There are automotive vehicle seats for adults comprising adaptation means so as to make them usable for a child as described in publications DE-A-28 07 064, JP-A-10 000972, FR-A-2 726 517, EP-A-0 803 398. More specifically, document JP-A-10 000972 describes a convertible head support for use by a child or an adult, especially in an automotive vehicle comprising a support and a flap that is hinged on the support around an axis that is essentially horizontal from a high user position for an adult to a low user position for a child, said flap comprising a generally flat support body presenting on one of its faces a head support surface for the adult and on its other face a head support surface for the child.

However, the architecture of these seats is often complex and rather expensive. This is why few car designers have proposed integrated retention devices. As for the flap in publication JP-A-10 000972, its main function is to fill out all or a part of a housing made in a seat backrest, which is left empty after a portion of that backrest has been lowered, thus forming a support cushion. This flap makes no contribution to safety nor to any adjustment intended for comfort.

This is why one most frequently resorts to accessories that for the most part must be dismantled before the seat can be used by an adult.

In their simplest version, these devices are made up of a support cushion which raises the child and permits the direct use of vehicle safety belts while at the same time, using a system of guides, ensuring the correct placement of the ventral strap strand of these belts in a subabdominal position above the cushions because the bones of the pelvic cavity of children under the age of 10 are not yet joined.

But such means cannot by themselves ensure the child's comfort and safety. Indeed, and this applies to the smallest child whose head is mostly under the adult support zone, the strand of the diagonal strap is bothersome because it cuts into their neck and they have a tendency, deliberately or not, to escape from it due to lack of lateral holds, particularly when they get drowsy, thus shifting into an unsafe position.

A complementary accessory of the "guide strap" type, which creates a supplementary link between the strands of the subabdominal and diagonal straps, can then be used to divert the layout of the diagonal strand in order to force it to run over the child's shoulder, but it does not prevent the latter from slipping.

Other accessories of the "headrest" type, as described in document FR-A-2 739 813, can ensure the lateral hold of the head of a child and divert the diagonal strand of the belt. We note that the shapes of these accessories will not easily prevent the children from sagging or slipping on the side opposite the diagonal strand of the belt because they are not sufficiently enveloping for this purpose.

Publication GB-A-3 302 268 describes a headrest associated with a head support cushion, but this device cannot be used by a child.

Other improved systems, such as those described in publication EP-A-0 751 033, comprise a backrest that is quite freely ratcheted so as to adapt to the various inclinations of the backrest behind a cushion of the above-mentioned type and generally comprising lateral supports that can be adjusted in terms of distance for the torso and the head as well as adjustable gears that improve the positioning of the belt on the shoulder of the child. Such systems, however, entail certain defects in case of an accident. As a matter of fact, being subjected to the action of prestressing devices, the diverted belt strap causes the backrest to rotate. Moreover, the thickness of the backrest, which determines the child's longitudinal position in the vehicle and the inertia of said backrest, are harmful because the child's torso and consequently the child's head are projected further forward in case of an accident.

Finally, there may be a need for such accessories occasionally and they may not be available at the desired moment, either because they were not purchased or because they are both bulky and unattractive so that there is a tendency to remove them as often as possible.

This invention is intended to mitigate these inconveniences.

To this end, the object of the invention is aconvertible head support for use by a child or an adult, especially in an automotive vehicle comprising a support and a flap that is hinged upon the support around an essentially horizontal axis from a high user position for an adult to a lower user position for a child, said flap comprising a generally flat support body presenting on one of its faces a head support surface for the adult and on its other face ahead support surface for the child, characterized in that said flap comprises two lateral, essentially vertical flanges that extend from the sides of the support body on the side of its face presenting the head support surface for the child and that the support body and the two lateral flanges are complementary with respect to said support so as to fit around the support when the flap is in the high position.

The flap thus is a kind of cushion that is hinged upon the support around the lower edge of the latter. When it is fit on the latter, it presents, forward, one of its faces which forms the head support for an adult occupant. In this state, the complementary nature of the external shapes of the support with those of the interior and the exterior of the flap creates a situation where one no longer detects any difference with a conventional head support.

The flanges permit the lateral retention of the child's head. This retention is obviously useful in case of a lateral shock; but it also provides greater comfort, particularly when the child sleeps.

It is noted that one can provide a system for locking the device in this position so as to prevent any untimely deployment of the flap in case of an accident or under normal driving conditions. As an accessory, the complementary nature of the shapes can play a role in this locking action by virtue of the elasticity of the lateral flanges.

When, on the other hand, the flap is deployed downward, the other face of the flap is directed forward and thus forms ahead support for a child. It is understood that the low position of the pivot axis of the flap enables the latter to satisfy the needs of the smallest children involved.

In a particular embodiment, the head support according to the invention comprises at least one mounting peg on the back of a seat, said support being mounted on one end of said peg.

The mounting of the peg on the seat is preferably of the sliding kind. The head support can thus be adjusted in terms of height for use by adults and children.

In a particular embodiment, said lateral hinges extend essentially from the area of the support body, which is in the low portion when the flap is in the low user position for a child.

Such an arrangement can ensure improved support while guaranteeing the child's visual comfort. These shapes, which are very close to the neck of the child, are in fact capable—when the child's head tilts onto its shoulder—of slipping between these parts of the body, forming a cushion, thus blocking any lateral and vertical movement of the child's head.

Likewise, in a particular embodiment, the head support comprises at least one safety strap guide mounted on said flap.

This safety belt or harness guide makes it possible to guide the straps on the shoulders of the child so as to cause the latter to pass across the body of the child on the level of the torso and not on the level of the neck.

More particularly, the safety belt guide can be mounted on said lateral flanges.

The possibilities of adjusting the height of the device make it possible to put the flanges immediately above the child's shoulders. They are thus in an optimal position for guaranteeing the most direct possible layout of the safety belts with three anchoring points and for maintaining the distance of the harness straps by four points and more.

Said support can have a longitudinal, L-shaped section so as to adjust to the forward and top faces of an assembly structure, such as the upper portion of the seat's back.

The portion of the lateral flanges of said flap, protruding from the surface of the head support for the child when viewed from the side, can present a shape essentially identical to that of said support.

The head support surface for the adult for this particular flap can be essentially complementary to the forward side of said support.

In a particular embodiment, the head support portion forming the support comprises means for adjusting the hinge of the flap in terms of height, thus increasing the possibilities of correctly positioning the flap.

More particularly, said adjusting means can comprise means for memory-storing the child user position.

The use of the flap thus makes it possible to think terms of seating children of any size directly on the seat since the head support surface is then shifted downward to the level of the backrest of the bench. The head support, according to the invention, thus becomes one of the essential participating elements of a child retention system.

By way of nonrestrictive example, we will now describe several particular embodiments of the invention with reference to the enclosed diagrams where:

FIG. 1 is a perspective view of a head support according to the invention in the adult position;

FIG. 2 is a perspective view of said head support in the child's position;

FIG. 3 is a longitudinal profile view of the same head support;

Figure 4:
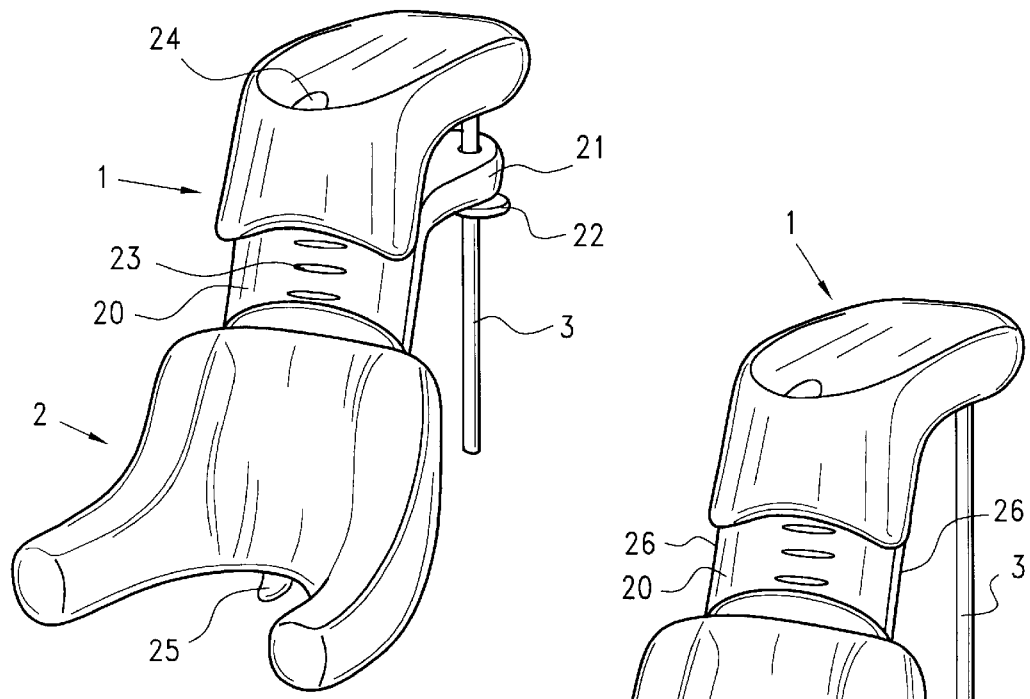
FIG. 4 is a perspective view of another embodiment of the head support which, according to the invention, comprises supplementary adjustment means for the child's position.

The head support in FIGS. 1 to 3 consists essentially of two parts, a support 1 and a flap 2. Support 1 is mounted at the upper end of 2 pegs 3 that slide in sleeves 4 in the upper portion of backrest 5 of a rear bench of an automotive vehicle.

Support 1 and flap 2 present a common horizontal edge on whose level they are hinged by any suitable means, forming a hinge 6. This common edge is the lower edge for support 1 and is either in the high portion or in the low portion of flap 2, depending on its position.

This position can be either a high position corresponding to the use of the head support by an adult or a low position for the use of the head support by a child. The switch from one position to the other is accomplished by rotating the flap by about 180° around hinge 6.

Support 1 and flap 2 both, when viewed from the side, have an L-shape so that when flap 2 is in the high position, both the support and the flap will essentially present the shape of the top of backrest 5.

Support 1 has an essentially constant longitudinal L-shaped section. It comprises a fitting 7, made of plastic substance comprising an anchoring block 8 for pegs 3, buckle 9 that is curved downward and rigidification ribs 10.

The flap comprises a support body 11 and two lateral flanges 12 that extend from the edges of the support body adjacent to hinge 6 forward when flap 2 is in the low position. In fact, flanges 10 extend forward essentially in the low portion of the flap (when it is in the low position), which gives it the L-shape when viewed from the side.

Flap 2 also has a plastic fitting 13, made up of a buckle 14 and two fitting plates 15 for the lateral flanges 12.

Support 1 and flap 2 around their respective fitting comprise a foam facing and a textile cover. Their hinge can furthermore be confined to this textile cover.

The upper part 16 of support 1 has a shape that is complementary to the space between body 11 and flanges 12 of the flap. Thus, when the flap is in the high position, the assembly looks like a conventional head support. The face of body 11 that is opposite to flanges 12 is then turned forward and serves as head support for an adult.

When the flap is folded down, the other face of body 11 is turned forward and serves as head support surface for a child. Flanges 12 then ensure the lateral retention of the child's head.

One notes that one of the flanges supports a safety strap guide 17. This guide can consist of a simple crossbar attached to the flange at one of its ends, while its other end is free for the passage of the strap.

Figure 5:
FIG. 5 is a perspective view of another embodiment of the head support comprising other means for adjustment again in the child's position.

In one of the embodiments in FIGS. 4 and 5, the articulation of flap 2 on support 1 is accomplished by means of a pallet 20, that is to say, the rotation axis is provided between the high portion (in the figure) of flap 2 and pallet 20.

In the embodiment shown in FIG. 4, this pallet 20 has in its upper portion a rim 20 [sic], equipped with openings in which are engaged pegs 3.

Suitable locking means 22 are provided to lock the pallet in terms of height or to unlock it so as to permit its adjustment. A marker 22 on pallet 20 makes it possible to visualize the size of the child to which the adjustment is suited.

This head support furthermore comprises complementary means 24, 25 for the purpose of locking it in its adult user position.

In the embodiment shown in FIG. 5, edges 26 of pallet 20 are so arranged as to slide in a slide (not shown) that is integral with support 1. Any suitable height-locking means can also be provided.

Figure 6:
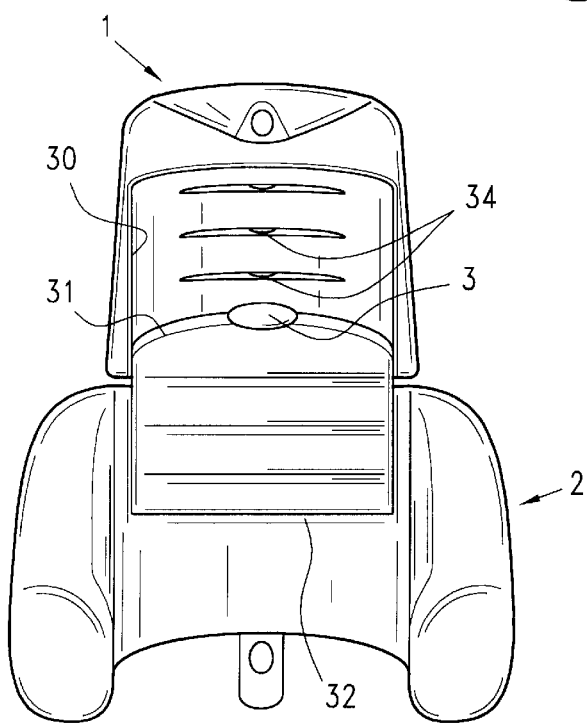
FIG. 6 is a front view of one of the embodiments of the head support which, according to the invention, makes it possible to memory-store the adjustment of the flap in the intermediate position.

In the embodiment shown in FIG. 6, the articulation of flap 2 on support 1 is accomplished by means of a cart (not shown), mounted so as to slide in slides 30 that are integral with the face.

A flexible guard 31 is attached at 32 approximately midway up the support surface for a child and extends beyond the upper portion (in the figure) of flap 2. In its upper portion, guard 31 has a means of attachment 33 that can cooperate with a plurality of complementary means 34 on the forward face of support 1.

The particular means 34 on which is fixed the fixation means 33 thus determines the height of the flap when it is in the child user position. When one pivots flap 2 with respect to the cart so as to return it to the adult position, the cart returns to its lowest position and the flap fits suitably on support 1.

What is claimed is:

1. Convertible head support for use by child or adult, particularly in an automotive vehicle comprising a support (1) and a flap (2), hinged on the support around an essentially horizontal axis (6) from a high user position for an adult to a lower user position for a child, said flap comprising a support body (11) that is generally flat and that on one of its faces has a head support surface for an adult and on its other face a head support surface for a child, characterized in that said flap comprises two lateral, essentially vertical flanges (12) that extend from the sides of the support body (11) on the side of its face presenting the head support surface for the child and that the support body (11) and the two lateral flanges (12) are complementary with respect to said support (1) so as to fit around the support when said flap (2) is in the high position.

2. Head support, according to claim 1, comprising at least one mounting peg (3) on the back of a seat, said support being mounted at one end of said peg.

3. Head support according to claim 1, where said lateral flanges (12) essentially extend from the area of the support body (11) which is in a low portion when flap (2) is in the low user position for a child.

4. Head support according to claim 1, comprising at least one safety strap guide (17) mounted on said flap.

5. Head support according to claim 4, where the safety strap guide is mounted on said lateral flanges (12).

6. Head support according to claim 1, where said support (1) presents a longitudinal L-shaped section so as to adjust to forward and top faces of a mounting structure (5).

7. Head support according to claim 1, where the portion of the lateral flanges (12) of said flap (2), protruding from the head support surface for a child when viewed from the side, has a shape that is essentially identical to that of said support (1).

8. Head support according to claim 1, where the head support surface for the adult of said flap (2) is essentially complementary to the forward face of said support (1).

9. Head support according to claim 1, where the head support portion forming the support comprises means for the height adjustment of the flap's hinge.

10. Head support according to claim 9, where said height adjustment means comprise means for memory storage of the child user position.

* * * * *